US012148993B2

(12) United States Patent
Su et al.

(10) Patent No.: US 12,148,993 B2
(45) Date of Patent: Nov. 19, 2024

(54) SCATTERING FILM AND ELECTRONIC DEVICE WITH SCATTERING FILM

(71) Applicant: GUANGZHOU FANGBANG ELECTRONICS CO., LTD., Guangdong (CN)

(72) Inventors: Zhi Su, Guangdong (CN); Qiang Gao, Guangdong (CN)

(73) Assignee: GUANGZHOU FANGBANG ELECTRONICS CO., LTD, Guangdong (CN)

( * ) Notice: Subject to any disclaimer, the term of this patent is extended or adjusted under 35 U.S.C. 154(b) by 355 days.

(21) Appl. No.: 17/632,639

(22) PCT Filed: Dec. 17, 2019

(86) PCT No.: PCT/CN2019/125926
§ 371 (c)(1),
(2) Date: Feb. 3, 2022

(87) PCT Pub. No.: WO2021/022753
PCT Pub. Date: Feb. 11, 2021

(65) Prior Publication Data

US 2022/0294122 A1 Sep. 15, 2022

(30) Foreign Application Priority Data

Aug. 6, 2019 (CN) ......................... 201910722601.6

(51) Int. Cl.
*H01Q 15/14* (2006.01)

(52) U.S. Cl.
CPC .................................. *H01Q 15/14* (2013.01)

(58) Field of Classification Search
CPC ...................................................... H01Q 15/14
See application file for complete search history.

(56) References Cited

U.S. PATENT DOCUMENTS

2012/0194399 A1* 8/2012 Bily ....................... H01Q 15/02
343/700 R

FOREIGN PATENT DOCUMENTS

| | | | |
|---|---|---|---|
| CN | 104201468 | A | 12/2014 |
| CN | 105993098 | A | 10/2016 |
| CN | 108323145 | A | 7/2018 |
| CN | 208095043 | U | 11/2018 |
| CN | 20842512 | U | 1/2019 |
| CN | 208425127 | U | 1/2019 |
| CN | 208708071 | U | 4/2019 |
| JP | 2016144164 | A | 8/2016 |

(Continued)

*Primary Examiner* — Graham P Smith
(74) *Attorney, Agent, or Firm* — Shumaker, Loop & Kendrick, LLP; James D. Miller

(57) ABSTRACT

Provided are a scattering film and an electronic device with the scattering film. The scattering film includes: a carrier layer configured to emit microwave signals and/or receive microwave signals and a first protruding structure arranged on the surface of the carrier layer; and when passing through the first protruding structure, microwaves are reflected. According to the solution, a first protruding structure is provided, and microwaves can be reflected when passing through the first protruding structure, so that the transmitting and/or receiving space range for the microwaves which are originally only directionally transmitted is enlarged, and the coverage range of microwave signals is increased.

17 Claims, 5 Drawing Sheets

(56) References Cited

FOREIGN PATENT DOCUMENTS

| | | | |
|---|---|---|---|
| KR | 20150071495 | A | 6/2015 |
| WO | 2015168542 | A1 | 11/2015 |

* cited by examiner

SCATTERING FILM AND ELECTRONIC DEVICE WITH SCATTERING FILM

CROSS-REFERENCE TO RELATED APPLICATION

This patent application is a United States nation phase patent application based on PCT/CN2019/125926 filed on Dec. 17, 2019, which claims the benefit of Chinese Patent Application No. 201910722601.6 filed on Aug. 6, 2019, the entire disclosures of which are hereby incorporated herein by reference.

TECHNICAL FIELD

The present disclosure relates to a technical field of communication, for example, to a scattering film, and an electronic device with the scattering film.

BACKGROUND

Microwave communication refers to a communication performed by an electromagnetic wave with a wavelength being in a range of 0.1 mm to 1 m. A frequency range corresponding to the electromagnetic wave in a wavelength band is 300 MHz (0.3 GHz) to 3 THz. Since a microwave has a characteristic of linear transmission, the microwave communication has a directing property. When a user is not in a specified direction region, a signal cannot be received, resulting in a communication blind district.

SUMMARY

The present disclosure is intended to provide a scattering film. A microwave is scattered after penetrating the scattering film, so as to expand a microwave transmission and/or receiving space range, thereby avoiding communication blind districts as much as possible.

The present disclosure is intended to further provide an electronic device. The device has a large microwave signal transmission and/or receiving range, so that the user may have good usage experience.

In order to realize the above objectives, the following technical solutions are provided.

On one hand, a scattering film is provided and includes a first carrier layer configured to transmit a microwave signal and/or receive the microwave signal and a first protruding structure disposed on a surface of the carrier layer. A microwave is reflected when passing through the first protruding structure. According to the solution, through the arrangement of the first protruding structure, the microwave may be reflected when passing through the first protruding structure, so that a transmission and/or receiving space range of the microwave that is originally transmitted only in a directional manner is increased, thereby enlarging a coverage of the microwave signal.

On the other hand, an electronic device is provided and includes the scattering film and an antenna device. A surface of the antenna device is connected with the scattering film.

In an implementation, an electromagnetic scattering film is disposed on the other surface opposite to the surface of the antenna device provided with the scattering film. The electromagnetic scattering film at least includes a second carrier layer. The second carrier layer is provided with a through hole penetrating an upper and lower surface of the second carrier layer.

According to the electronic device provided by an embodiment of the present disclosure, the scattering film is connected with the antenna device. The microwave signal, transmitted and/or received by the antenna device, may be reflected outwards from the first protruding structure of the scattering film, so that the microwave signal transmission and/or receiving space range of the electronic device is enlarged. In addition, the electromagnetic scattering film is further disposed on the other surface of the antenna device. Through the through hole of the electromagnetic scattering film, the microwave transmitted by the antenna device and the microwave reflected by the scattering film are diffracted. Therefore, the microwave transmission and/or receiving space range is further enlarged, a signal blind zone of the electronic device is avoided, and the usage experience of a user is improved.

REFERENCE NUMERALS

1: Scattering film;
11: First carrier layer;
111: Signal circuit;
12: First connecting layer;
13: First protruding structure;
131: Protruding portion;
14: First insulation layer;
15: Second protruding structure;
2: Antenna device;
21: Antenna circuit;
22: Base plate;
3: Electromagnetic scattering film;

31: Second carrier layer;
311: Through hole;
32: Second connecting layer;
33: Third protruding structure;
34: Second insulation layer;
35: Fourth protruding structure.

DETAILED DESCRIPTION OF THE EMBODIMENTS

In order to make technical problems, technical solutions, and technical effects of the present disclosure clearer, the following, in detail, further describes the technical solutions in the embodiments of the present disclosure with reference to the accompanying drawings in the embodiments of the present disclosure. Apparently, the described embodiments are some but not all of the embodiments of the present disclosure. Based on the embodiments in the present disclosure, all other embodiments obtained by those skilled in the art without creative work shall fall within the protection scope of the present disclosure.

Figure 1:
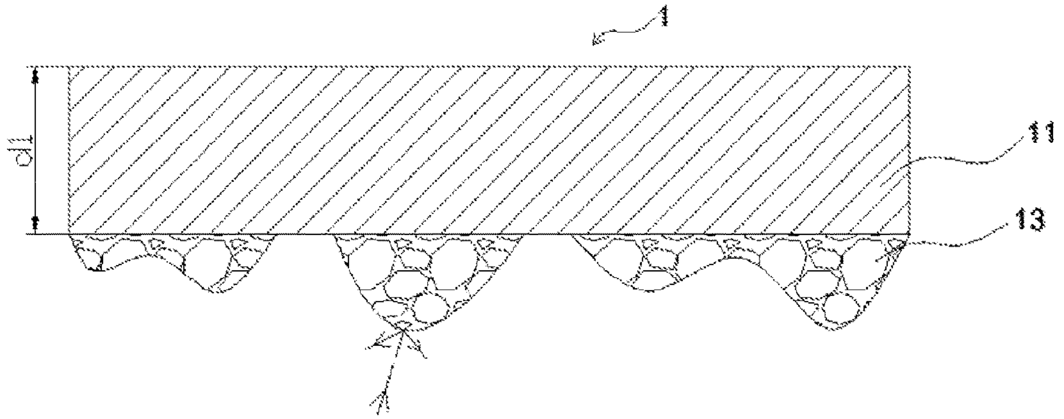
FIG. 1 is a schematic structural diagram of a scattering film according to an embodiment of the present disclosure (receiving a microwave signal).

FIG. 1 is a schematic structural diagram of a scattering film according to an embodiment of the present disclosure. Referring to FIG. 1, a scattering film 1 provided in an embodiment of the present disclosure includes a first carrier layer 11 and a first protruding structure 13 disposed on a surface of the first carrier layer 11. In the technical field of communication, an important means for realizing data exchange is signal transmission, and microwave signal transmission is one of the means. Since a microwave signal is linearly transmitted in a specified direction, the microwave signal may not be received in a region that is not in the specified direction, or the microwave signal cannot be transmitted to a region outside the specified direction, resulting in communication failure. An arrow direction shown in FIG. 1 is an exemplary microwave transmission direction. The scattering film provided by the embodiment of the present disclosure adopts a diffuse reflection principle. By disposing the first protruding structure 13 on the first carrier layer 11, when the microwave is emitted to pass through the first protruding structure 13, reflection may occur, so that a motion path of the microwave that is originally and directionally transmitted only is changed. Transmission paths in a plurality of directions are generated through reflection, so as to expand a microwave transmission and/or receiving space range.

Figure 2:
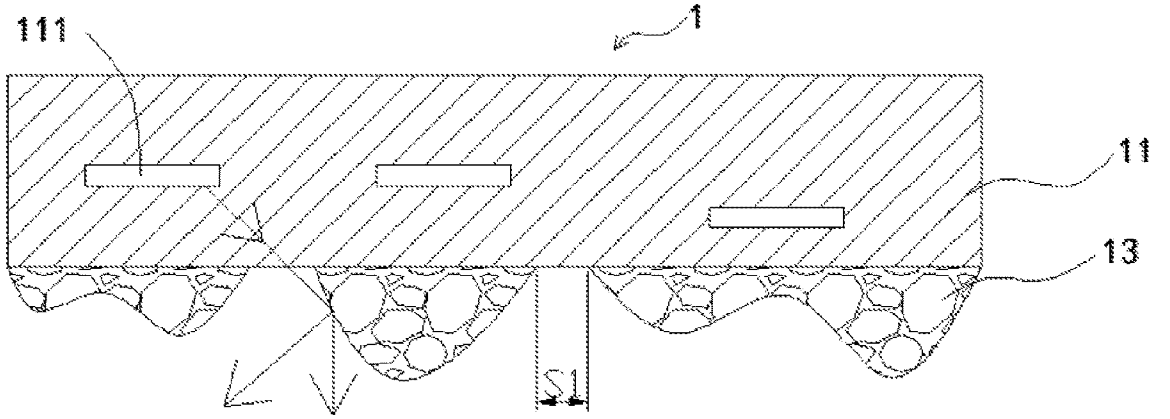
FIG. 2 is a schematic structural diagram of a scattering film according to an embodiment of the present disclosure (transmitting a microwave signal).

The first carrier layer 11 of the present disclosure is configured to transmit a microwave signal and/or receive the microwave signal. The first carrier layer 11 may include a metal layer. The metal layer may achieve a reflection effect on the microwave signal. For example, the first carrier layer 11 is made of a metal material. The first carrier layer 11 may further include an insulation layer. In this case, the reflection effect of the microwave signal is implemented mainly by the first protruding structure. In the above embodiment, the first carrier layer 11 is configured to receive the microwave signal. In other embodiments of the present disclosure, the first carrier layer 11 may further be configured to transmit the microwave signal. As shown in FIG. 2, in an illustrative embodiment, a conductive metal signal circuit 111 is disposed on a surface of the first carrier layer 11 or inside the first carrier layer 11. An arrow direction in the figures is an exemplary microwave transmission direction. When the first carrier layer 11 includes the signal circuit 111, the first carrier layer 11 may transmit the microwave signal outwards. The microwave signal is reflected when passing through the first protruding structure 13, so that the transmission space range of the microwave signal is expanded.

With regard to a material realizing a microwave reflection function, the present disclosure may use the first protruding structure 13 made of a metal material. Definitely, the present disclosure does not make any limitations. Materials that can realize the microwave reflection function are applicable to the present disclosure. For example, the present disclosure may further use the first protruding structure 13 made of an alloy material. In an implementation solution, the first carrier layer 11 includes a metal layer. The first protruding structure 13 is made of the metal material. The metal layer is, for example, a circuit board having a conductive metal pattern. The first protruding structure 13 may be a metal protruding portion disposed on the metal layer. By using the same material to make the first carrier layer 11 and the first protruding structure 13, the binding force of the first carrier layer and the first protruding structure may be improved, so that the first protruding structure 13 is not easy to fall on the first carrier layer 11. Therefore, the service life and stability of the scattering film 1 are guaranteed. Definitely, in other embodiments, the first carrier layer 11 may further include an insulation layer. For example, the insulation layer is made of a resin material. In this case, the first protruding structure 13 on the first carrier layer 11 is made of the metal material, and includes a plurality of protruding portions. A distance S1 between the adjacent protruding portions is less than a wavelength of the microwave, which may similarly cause the microwave to be reflected when passing through the first protruding structure 13. For example, the distance S1 between the adjacent protruding portions is in a range of 0 μm to 500 μm. It is to be noted that, the distance between the adjacent protruding portions refers to a shortest distance between outlines of the adjacent two protruding portions. In an example, the first carrier layer 11 and/or the first protruding structure 13 may be made of any metal material or two or more alloy materials of copper, aluminum, titanium, zinc, iron, nickel, chromium, cobalt, silver and gold.

A thickness d1 of the first carrier layer 11 of the present disclosure shall be as thin as possible in a case of guaranteeing that a product is not lose efficacy, so as to cause the entire scattering film 1 to be lighter and thinner. In this embodiment of the present disclosure, the thickness d1 of the first carrier layer 11 may be in a range of 0.1 μm to 10 μm.

Figure 3:
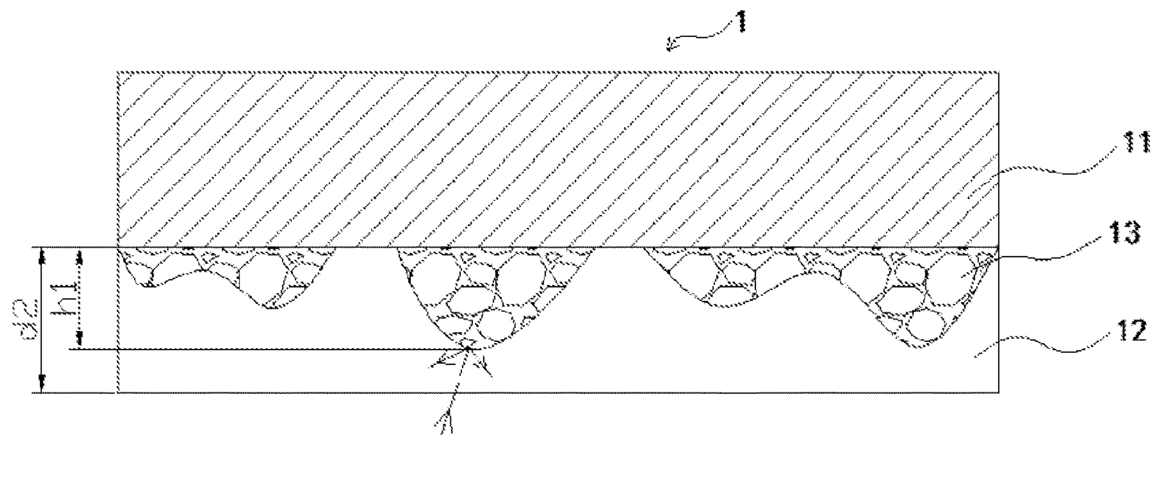
FIG. 3 is a schematic structural diagram of a scattering film provided with a connecting layer according to another embodiment of the present disclosure.

FIG. 3 is a schematic structural diagram of a scattering film according to an embodiment of the present disclosure. As shown in FIG. 3, for ease of connection between the scattering film 1 of the present disclosure and other components, a first connecting layer 12 is disposed on a surface of the first carrier layer 11. The first connecting layer 12 and the first protruding structure 13 are located on the same surface of the first carrier layer 11. The first protruding structure 13 protrudes into the first connecting layer 12. In an embodiment of the present disclosure, the first connecting layer 12 is an adhesive film layer. Through the arrangement of the adhesive film layer, the scattering film 1 in this embodiment can easily achieve external connection. In order to guarantee the reliability of connection, the adhesive film layer covers all of the first protruding structures 13. Therefore, in this embodiment, a height h1 of the first protruding structure 13 is less than or equal to a thickness d2 of the first connecting layer 12. Through the design, the first protruding structure 13 is guaranteed to protrude into the first connecting layer 12 but not protrude out of the first connecting layer 12. It is to be noted that, the first protruding structure 13 may include a plurality of protruding portions 131 with different heights. In this case, the height h1 of the first protruding structure 13 refers to the highest height of all of the protruding portions 131. An outer surface of the adhesive film layer and the surface of the first carrier layer 11 may be flat surfaces without undulation, or may be gently undulating non-flat surfaces, which are not limited thereto in the present disclosure. For example, a material used by the adhesive film layer is selected from any of epoxy resin, modified epoxy resin, acrylic acid, modified rubber, thermoplastic polyimide, modified thermoplastic polyimide, polyurethane, polyacrylate or silicone.

Figure 4:
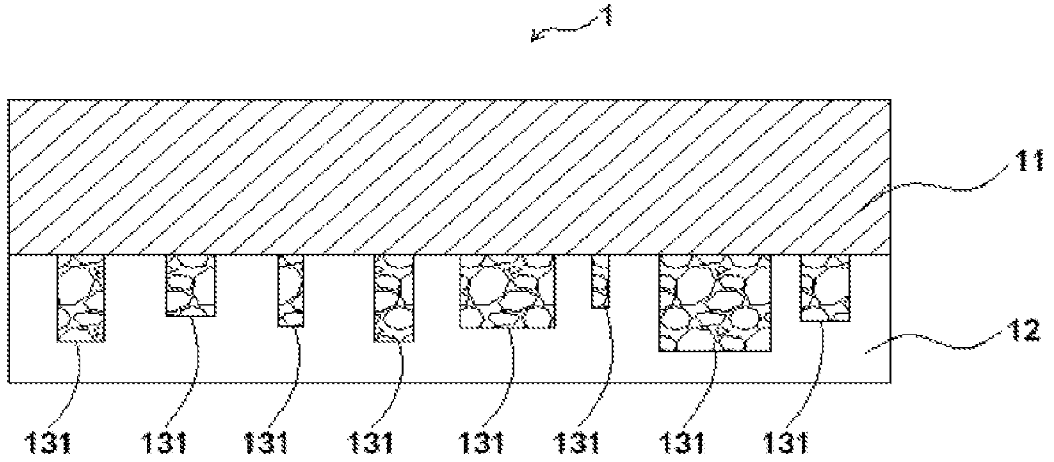
FIG. 4 is a first schematic structural diagram of a scattering film according to an embodiment of the present disclosure.
Figure 5:
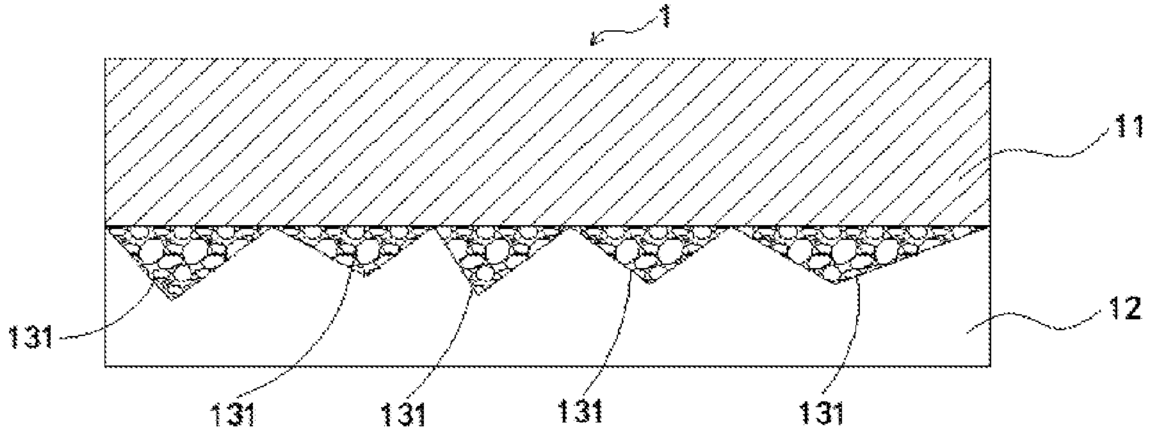
FIG. 5 is a second schematic structural diagram of a scattering film according to an embodiment of the present disclosure.
Figure 6:
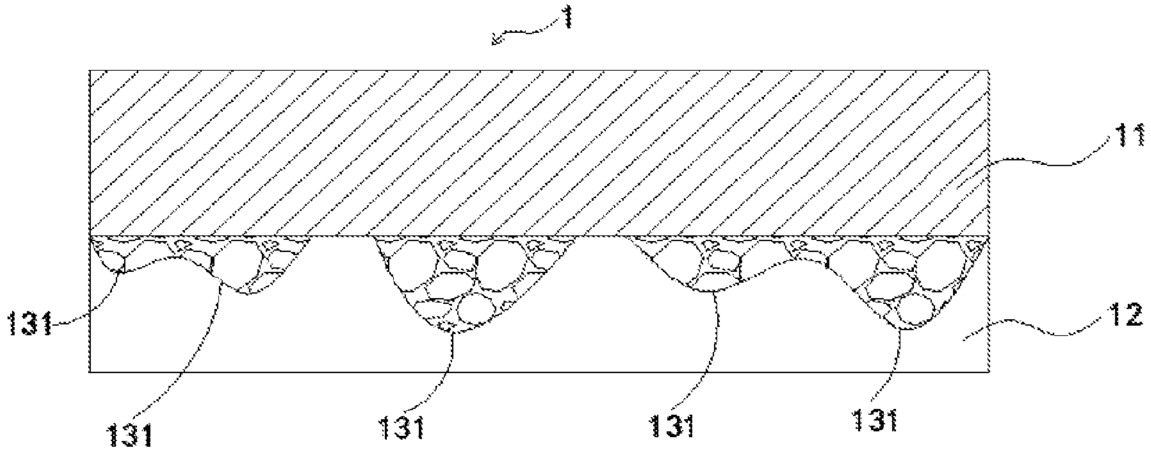
FIG. 6 is a third schematic structural diagram of a scattering film according to an embodiment of the present disclosure.

In this embodiment of the present disclosure, the first protruding structure 13 includes the plurality of protruding portions 131. The protruding portions 131 are integrally arranged on the first carrier layer 11 in a matrix array. The adjacent protruding portions 131 are connected with each other, or may be spaced apart from each other. Sizes of the protruding portions 131 are not specifically limited in the present disclosure. The sizes of the plurality of protruding portions 131 may be the same or different. FIG. 4 is a first schematic structural diagram of a scattering film according to an embodiment of the present disclosure. In this embodiment, the plurality of protruding portions 131 are spaced apart from each other on the surface of the first carrier layer 11. FIG. 5 is a second schematic structural diagram of a scattering film according to an embodiment of the present disclosure. In this embodiment, the plurality of protruding portions 131 are serially arranged on the surface of the first carrier layer 11. FIG. 6 is a third schematic structural diagram of a scattering film according to an embodiment of the present disclosure. In this embodiment, one part of the plurality of protruding portions 131 are spaced apart from each other on the surface of the carrier layer 11, and the other part of the plurality of protruding portions are serially arranged on the surface of the carrier layer 11.

In an embodiment of the present disclosure, the first protruding structure 13 may have diverse shapes according to actual needs, which may be in a regular or irregular solid geometric shape. In some examples, the shape of the first protruding structure 13 includes one or more of a pointed shape, an inverted cone shape, a granular shape, a dendritic shape, a columnar shape, or a block shape. For example, in an example of FIG. 4, the first protruding structure 13 is in a columnar structure. In an example of FIG. 5, the first protruding structure 13 is in a triangular shape. In an example of FIG. 6, the first protruding structure 13 is in an irregular curved surface shape. Those skilled in the art can understand that, the shape of the first protruding structure 13 is applicable to the present disclosure, as long as it has any one, two or more than two of inclined surfaces, cambered surfaces, planes and irregular reflection surfaces that are favorable for microwave reflection. Through the design of the reflection surfaces, the purpose of the reflection of the present disclosure to change a microwave transmission path can be achieved.

Figure 7:
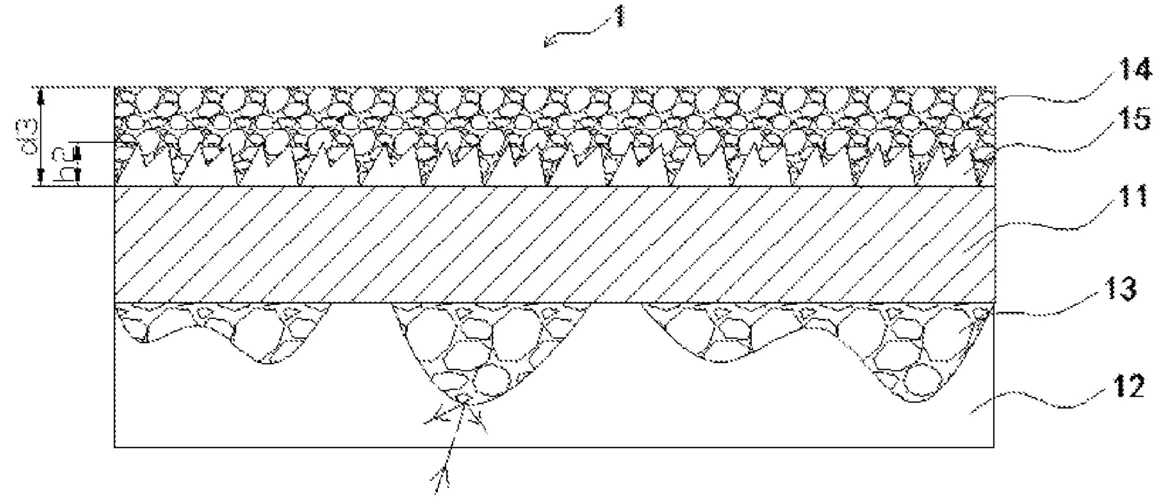
FIG. 7 is a schematic structural diagram of a scattering film according to another embodiment of the present disclosure.

FIG. 7 is a schematic structural diagram of a scattering film according to another embodiment of the present disclosure. Referring to FIG. 7, in this embodiment, a first insulation layer 14 is disposed on the other surface opposite to the surface of the first carrier layer 11 provided with the first protruding structure 13. The first insulation layer 14 has functions of insulation and protection, prevents the first carrier layer 11 from coming into contact with other external electronic elements to cause short circuit during the using of the scattering film 1, and may further protect the first carrier layer 11 from being damaged during use. In an implementation, the first insulation layer 14 uses any of a PPS thin film layer, a PEN thin film layer, a polyester film layer, a polyimide film layer, a film layer formed after epoxy ink is cured, a film layer formed after polyurethane ink is cured, a film layer formed after modified acrylic resin is cured, or a film layer formed after polyimide resin is cured. In order to improve the reliability of connection between the first carrier layer 11 and the first insulation layer 14, and prevent the stripping off between the first insulation layer 14 and the first carrier layer 11, in this embodiment of the present disclosure, a second protruding structure 15 protruding into the first insulation layer 14 is disposed on the surface of the first carrier layer 11. As shown in FIG. 7, the second protruding structure 15 includes a plurality of protruding portions. The protruding portions are protruded in a direction from the surface of the first carrier layer 11 to the first insulation layer 14. Definitely, those skilled in the art can understand that, the protruding portions may further be protruded in a direction from the first insulation layer 14 to the surface of the first carrier layer 11. A shape, quantity and size of the second protruding structure 15 are not limited in the present disclosure. The protruding portions are applicable to the present disclosure, as long as the protruding portions meet a requirement of improving the reliability of connection between the first insulation layer 14 and the first carrier layer 11. Exemplarily, the shape of the second protruding structure 15 may include one or more of a pointed shape, an inverted cone shape, a granular shape, a dendritic shape, a columnar shape, or a block shape. In an example of FIG. 7, the second protruding structure 15 is in a triangular shape. In addition, a height h2 of the second protruding structure 15 is less than or equal to a thickness d3 of the first insulation layer 14. Through the design, the second protruding structure 15 is guaranteed to protrude into the first insulation layer 14 but not protrude out of the first insulation layer 14, so as to avoid the first insulation layer 14 from losing efficacy. It is to be noted that, when the second protruding structure 15 includes the plurality of protruding portions with different heights, the height h2 of the second protruding structure refers to the highest height of all of the protruding portions. In an implementation, the thickness d3 of the first insulation layer 14 is in a range of 1 μm to 25 μm. The height h2 of the second protruding structure 15 is in a range of 0.1 μm to 15 μm.

For adapting of more application scenarios, the scattering film 1 described in the present disclosure is in a flexible, foldable and bendable structure. In an implementation, the first carrier layer 11 may adopt a flexible structure, such as a Flexible Printed Circuit (FPC). The adhesive film layer for connection and disposed on one surface of the first carrier layer 11 is foldable. The first insulation layer 14 for protection and disposed on the other surface of the first carrier layer 11 is bendable. Therefore, the scattering film 1 in the present disclosure is foldable and bendable. During actual use, the scattering film may be bent or folded into an annular structure, a semi-closed structure and other shapes, such as an arc-shaped structure, an oval structure, and a stack structure, according to needs.

An embodiment of the present disclosure provides a method for manufacturing a scattering film. The method includes the following steps.

(1) A first carrier layer 11 is provided, a first protruding structure 13 is disposed on a surface of the first carrier layer 11, and the first protruding structure 13 and the first carrier layer 11 are integrally formed. When the first carrier layer 11 uses a circuit board having a conductive pattern, a specific position of the first protruding structure 13 in the circuit board can be calibrated in advance. Through a processing technology of the circuit board, the first carrier layer 11 provided with the first protruding structure 13 is formed at one time.

(2) A first connecting layer 12 is formed on the surface of the first carrier layer 11, and the first connecting layer 12 at least covers the first protruding structure 13. When the first connecting layer 12 uses an adhesive film layer, an adhesive material is first coated or printed on the surface of the first carrier layer 11, and then the adhesive film layer is obtained through curing. Or, the adhesive film layer is first coated on a release film, and then the adhesive film layer is pressed and transferred to the surface of the first carrier layer 11 through the release film. The adhesive film layer at least covers the first protruding structure 13.

Another embodiment of the present disclosure provides a method for manufacturing a scattering film. The method includes the following steps.

(1) A first carrier layer 11 is provided, that is, a carrier layer material having a conductive metal pattern is provided.

(2) A first protruding structure 13 is formed on a surface of the first carrier layer 11, and on the carrier layer material having the conductive metal pattern, a metal protruding portion is formed on the first carrier layer by one or more manners of electroplating, electroless plating, physical vapor deposition, chemical vapor deposition, or the like. The surface of the first carrier layer may be a flat surface without undulation, or may be non-flat surface with undulation.

(3) A first connecting layer 12 is formed on the surface of the first carrier layer 11 provided with the first protruding structure 13, and the first connecting layer 12 at least covers the first protruding structure 13.

When the first connecting layer 12 uses an adhesive film layer, an adhesive material is first coated or printed on the surface of the first carrier layer 11, and then the adhesive film layer is obtained through curing. Or, the adhesive film layer is first coated on a release film, and then the adhesive film layer is pressed and transferred to the surface of the first carrier layer through the release film. The adhesive film layer at least covers the first protruding structure 13.

Figure 8:
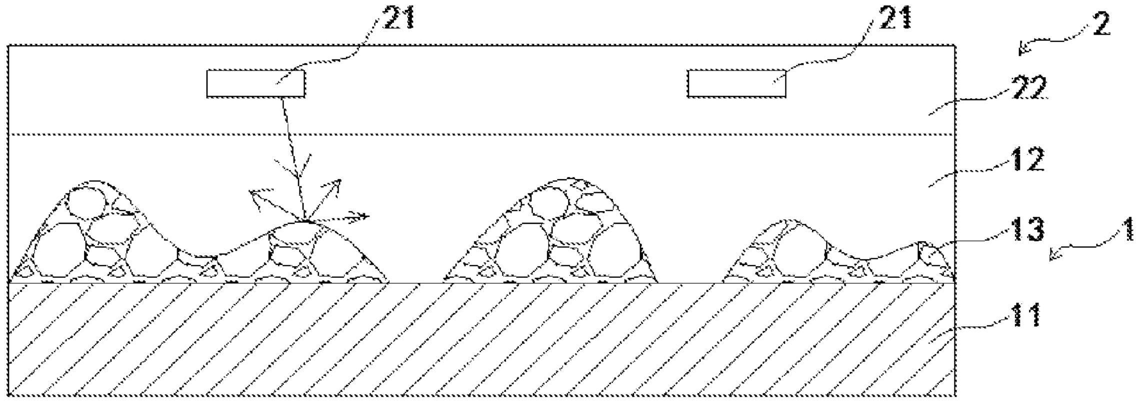
FIG. 8 is a schematic structural diagram of an electronic device according to an embodiment of the present disclosure.

FIG. 8 is a schematic structural diagram of an electronic device according to an embodiment of the present disclosure. Referring to FIG. 8, an embodiment of the present disclosure provides an electronic device. The electronic device includes an antenna device 2 and the scattering film 1. A surface of the antenna device 2 is connected with the scattering film 1. By connecting the scattering film 1 to the antenna device 2, a microwave signal transmitted by the antenna device 2 is reflected when passing through the first protruding structure 13 of the scattering film 1. In this embodiment, the antenna device 2 is connected with the scattering film 1 by a first connecting layer 12. In other embodiments, the antenna device 2 may further be connected with the scattering film 1 by a third connecting layer (not shown) disposed on a surface of the antenna device 2.

Figure 9:
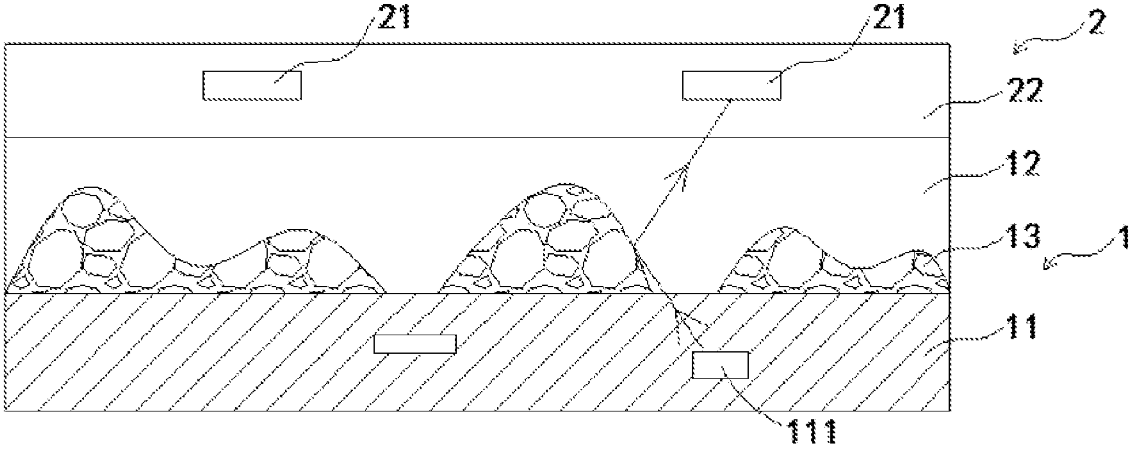
FIG. 9 is a schematic structural diagram of an electronic device according to another embodiment of the present disclosure.

FIG. 9 is a schematic structural diagram of an electronic device according to another embodiment of the present disclosure (an arrow in the figure showing a microwave transmission direction). A first carrier layer 11 of the scattering film 1 includes a signal circuit 111. The scattering film 1 is connected with the antenna device 2 by the first connecting layer 12. A microwave signal transmitted by the signal circuit 111 is reflected when passing through the first protruding structure 13, so that the transmission space range of the microwave signal is expanded. Through the design, a signal coverage of the electronic device is increased, and user experience is improved. In an implementation, the antenna device 2 includes an antenna circuit 21 and a base plate 22 configured to arrange the antenna circuit 21. A surface of the base plate 22 is attached to an adhesive film layer of the scattering film 1, so that connection between the antenna device 2 and the scattering film 1 is achieved.

Figure 10:
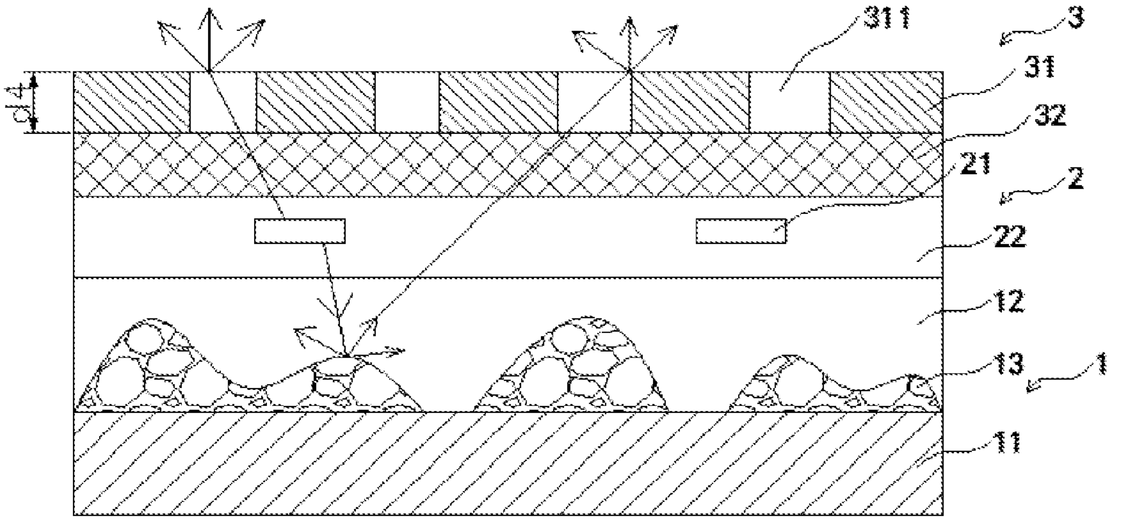
FIG. 10 is a schematic structural diagram of an electronic device according to yet another embodiment of the present disclosure.

FIG. 10 is a schematic structural diagram of an electronic device according to another embodiment of the present disclosure. In this embodiment, an electromagnetic scattering film 3 is disposed on the other surface opposite to the surface of the antenna device 2 provided with the scattering film 1. The electromagnetic scattering film 3 includes a second carrier layer 31 and a second connecting layer 32. The second carrier layer 31 is provided with a through hole 311 penetrating an upper and lower surface of the second carrier layer. The second connecting layer 32 is disposed on a surface of the second carrier layer 31 and configured to be connected with the antenna device 2. The electromagnetic scattering film 3 is disposed on the other side of the antenna device 2. The electromagnetic scattering film 3 achieves rapid connection with the antenna device 2 by designing the second connecting layer 32. The second connecting layer 32 may be the adhesive film layer. In this way, rapid adhesive connection with the antenna device 2 is achieved. On the other hand, the electromagnetic scattering film 3 is further provided with the through hole 311 penetrating an upper and lower surface of the electromagnetic scattering film. The microwave received and transmitted by the antenna device 2 is diffracted after passing through the through hole 311, so that the receiving and/or transmission space range of the microwave signal is expanded. In addition, the microwave reflected by the scattering film 1 also enters the through hole 311, so that the receiving and/or transmission space range of the microwave signal is further expanded, and the microwave is converted from directional transmission to multi-directional transmission. Therefore, the signal coverage of the electronic device can be increased, and user experience can be improved. Those skilled in the art can understand that, in other embodiments of the present disclosure, the electromagnetic scattering film 3 may further be connected with the antenna device 2 by a fourth connecting layer disposed on the surface of the antenna device 2.

In an example of FIG. 10, the through hole 311 is a circular hole. However, a shape of the through hole 311 is not limited in the present disclosure, and may be a polygonal hole such as a triangular hole and a quadrilateral hole, or other irregular shaped holes, as long as the microwave can be diffracted after entering the hole. In order to implement the above functions, the through hole 311 shall be designed as small as possible, and of which diameter is far less than a wavelength of the microwave. In an implementation, when the through hole 311 is the circular hole, a ratio of a diameter of the through hole 311 to the wavelength of the microwave is in a range of 1:200 to 1:100. When the through hole 311 is a non-circular hole, a ratio of a longest distance between two points on a cross-sectional edge of the through hole 311 to the wavelength of the microwave is in a range of 1:200 to 1:100. Therefore, the diameter of the through hole 311 or the longest distance between the two points on the cross-sectional edge of the through hole 311 is far less than the wavelength of the microwave. In this way, the microwave is guaranteed to be diffracted no matter from which direction the microwave is incident into the through hole 311. Therefore, the microwave is converted from directional transmission to multi-directional transmission, the signal coverage is increased, and the blind zone of the received signal is overcome. In an implementation, when the through hole 311 is the circular hole, the diameter of the through hole 311 is in a range of 1 μm to 500 μm. When the through hole is the non-circular hole, the longest distance between the two points on the cross-sectional edge of the through hole 311 is in a range of 1 μm to 500 μm.

In an embodiment of the present disclosure, the second carrier layer 31 is a metal conductive layer. By forming the through hole 311 in the second carrier layer 31, the diffraction of the microwave is realized. In an implementation, a metal residual rate of the second carrier layer 31 is in a range of 1% to 99%. Through the design, the microwave can be guaranteed to be fully covered after being diffracted by the electromagnetic scattering film. The metal residual rate refers to a ratio of a metal-containing cross-sectional area on the second carrier layer 31 to a cross-sectional area of the entire second carrier layer 31. The metal-containing cross-sectional area of the second carrier layer 31 is an area obtained by subtracting the cross-sectional area of the through holes 311 from the area of the entire second carrier layer 31. If the metal residual rate is too large, it indicates that there are more metal-containing areas of the second carrier layer 31. The microwave is reflected by a metal layer of the second carrier layer 31, so that a large number of microwaves cannot pass through the electromagnetic scattering film 3. If the metal residual rate is too small, the second carrier layer 31 is easily fractured, resulting in efficacy losing of the electromagnetic scattering film.

In this embodiment, a thickness d4 of the second carrier layer 31 may be in a range of 0.1 μm to 10 μm. Through the thickness design, the second carrier layer 31 is guaranteed to not be easily fractured and have desirable flexibility. In addition, the second connecting layer 32 uses the adhesive film layer. The adhesive film layer is a bonding layer without conductive particles, so that the problem that the through-hole 311 is blocked because the conductive particles are easily entered into the through-hole 311, and the microwave cannot pass through the through-hole 311 to generate diffraction is avoided.

Figure 11:
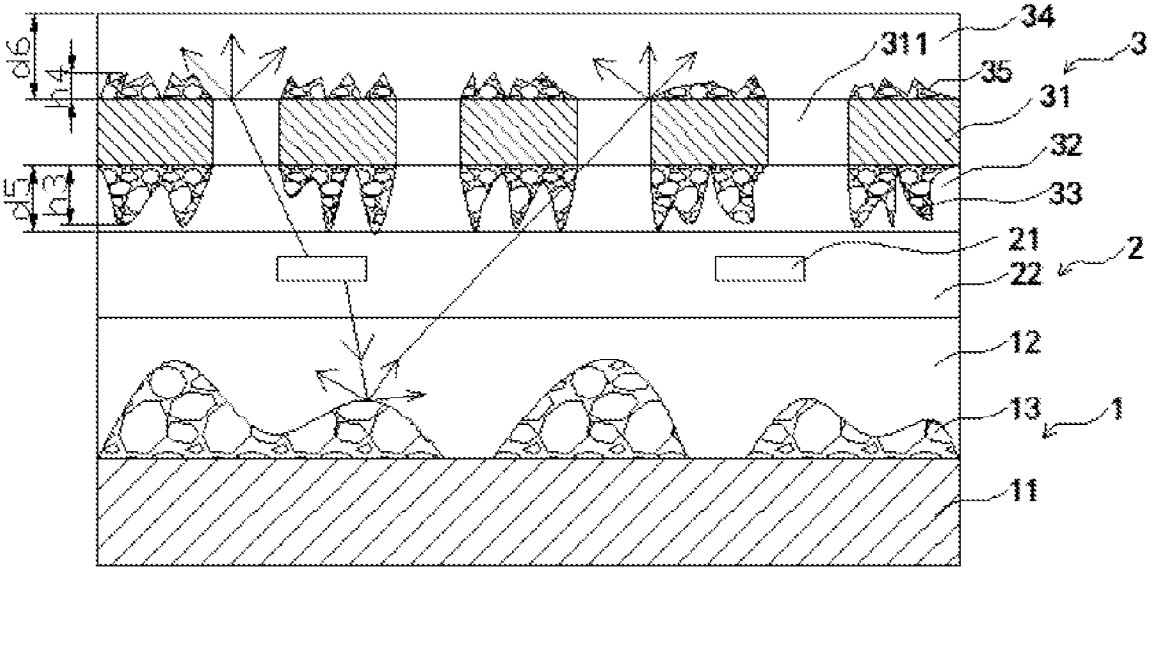
FIG. 11 is a schematic structural diagram of an electronic device according to still another embodiment of the present disclosure.

FIG. 11 is a schematic structural diagram of an electronic device according to another embodiment of the present disclosure. As shown in FIG. 11, in this embodiment, a third protruding structure 33 protruding into the second connecting layer 32 is disposed on the surface of the second carrier layer 31. By arranging the third protruding structure 33, when the electromagnetic scattering film 3 is used, external grounding is achieved, and interference charges are derived, so that the accumulation of the interference charges to form an interference source is prevented. For example, a height h3 of the third protruding structure 33 is in a range of 0.1 μm to 30 μm. A thickness d5 of the second connecting layer 32 is in a range of 0.1 μm to 45 μm. During usage, the third protruding structure 33 can pierce the second connecting layer 32, so that the electromagnetic scattering film can be guaranteed to be grounded. The third protruding structure 33 includes a plurality of protruding portions. Shapes and sizes of the plurality of protruding portions are not limited in the present disclosure. The protruding portions may be in one or more of a pointed shape, an inverted cone shape, a granular shape, a dendritic shape, a columnar shape, or a block shape. The sizes of the plurality of protruding portions may be the same or different.

A second insulation layer 34 is disposed on the other surface opposite to the surface of the second carrier layer 31 provided with the second connecting layer 32. The second insulation layer 34 has functions of insulation and protection, prevents the second carrier layer 31 of the electromagnetic scattering film 3 from coming into contact with other external electronic elements to cause short circuit during the using of the electromagnetic scattering film 3, and may further protect the second carrier layer 31 from being damaged during use. In an implementation, the second insulation layer 34 uses any of a PPS thin film layer, a PEN thin film layer, a polyester film layer, a polyimide film layer, a film layer formed after epoxy ink is cured, a film layer formed after polyurethane ink is cured, a film layer formed after modified acrylic resin is cured, or a film layer formed after polyimide resin is cured. In order to improve the reliability of connection between the second carrier layer 31 and the second insulation layer 34, and prevent the stripping off between the second insulation layer 34 and the second carrier layer 31, in this embodiment of the present disclosure, a fourth protruding structure 35 protruding into the second insulation layer 34 is disposed on the surface of the second carrier layer 31. As shown in FIG. 8, the fourth protruding structure 35 includes a plurality of protruding portions. The protruding portions are protruded in a direction from the surface of the second carrier layer 31 to the second insulation layer 34. Definitely, those skilled in the art can understand that, the protruding portions may further be protruded in a direction from the second insulation layer 34 to the surface of the second carrier layer 31. A shape, quantity and size of the fourth protruding structure 35 are not limited in the present disclosure. The protruding portions are applicable to the present disclosure, as long as the protruding portions meet a requirement of improving the reliability of connection between the second insulation layer 34 and the second carrier layer 31. Exemplarily, the shape of the fourth protruding structure 35 may include one or more of a pointed shape, an inverted cone shape, a granular shape, a dendritic shape, a columnar shape, or a block shape. In addition, a height h4 of the fourth protruding structure 35 is less than or equal to a thickness d6 of the second insulation layer 34. Through the design, the fourth protruding structure 35 is guaranteed to protrude into the second insulation layer 34 but not pierce the second insulation layer 34, so as to avoid the second insulation layer 34 from losing efficacy. It is to be noted that, when the fourth protruding structure 35 includes the plurality of protruding portions with different heights, the height h4 of the fourth protruding structure refers to the highest height of all of the protruding portions. In an implementation, the thickness d4 of the second insulation layer 34 is in a range of 1 μm to 25 μm. The height h4 of the fourth protruding structure 35 is in a range of 0.1 μm to 15 μm.

For adapting of more application scenarios, the electromagnetic scattering film 3 described in the present disclosure is in a flexible, foldable and bendable structure. In an implementation, the second carrier layer 31 may adopt a flexible structure, such as a metal circuit board, a FPC circuit board. The adhesive film layer for connection and disposed on one surface of the second carrier layer 31 is foldable. The second insulation layer 34 for protection and disposed on the other surface of the second carrier layer 31 is bendable. Therefore, the electromagnetic scattering film 3 in the present disclosure is foldable and bendable. During actual use, the scattering film may be bent or folded into an annular structure, a semi-closed structure and other shapes, such as an arc-shaped structure, an oval structure, and a stack structure, according to needs.

To sum up, according to the electronic device provided by an embodiment of the present disclosure, the scattering film is connected with the antenna device. The microwave signal, received and/or transmitted by the antenna device, may be reflected outwards from the first protruding structure of the scattering film, so that the microwave signal receiving and/or transmission space range is expanded. In addition, the electromagnetic scattering film is further disposed on the other surface of the antenna device. Through the through hole of the electromagnetic scattering film, the microwave transmitted by the antenna device and the microwave reflected by the scattering film are diffracted. Therefore, the microwave receiving and/or transmission space range is further expanded, a signal blind zone of the electronic device is avoided, and the usage experience of a user is improved.

It is to be noted that, the above is merely part of the embodiments and the used technical principles of the present disclosure.

What is claimed is:

1. A scattering film, comprising:

a first carrier layer, configured to transmit a microwave signal and/or receive the microwave signal;

a first protruding structure, disposed on a surface of the first carrier layer, wherein a microwave is reflected when passing through the first protruding structure; and a first connecting layer is disposed on the surface of the first carrier layer, the first connecting layer and the first protruding structure are located on a same surface of the first carrier layer, and the first protruding structure protrudes into the first connecting layer, wherein a first insulation layer is disposed on another surface opposite to a surface of the first carrier layer provided with the first protruding structure, and wherein a second protruding structure protruding into the first insulation layer is disposed on the surface of the first carrier layer.

2. The scattering film as claimed in claim 1, wherein the first carrier layer comprises a metal layer, and the first protruding structure is made of a metal material.

3. The scattering film as claimed in claim 1, wherein the first carrier layer comprises an insulation layer, the first protruding structure comprises a plurality of protruding portions, and a distance S1 between adjacent protruding portions in the plurality of protruding portions is less than a wavelength of the microwave; or a thickness d1 of the first carrier layer is in a range of 0.1 μm to 10 μm.

4. The scattering film as claimed in claim 1, wherein the first protruding structure comprises a plurality of protruding portions, and the plurality of protruding portions are spaced apart from each other on the surface of the first carrier layer; or the plurality of protruding portions are serially arranged on the surface of the first carrier layer; or a first part of the plurality of protruding portions are spaced apart from each other on the surface of the first carrier layer, and a second part of the plurality of protruding portions are serially arranged on the surface of the first carrier layer.

5. The scattering film as claimed in claim 1, wherein the first carrier layer and/or the first protruding structure is made of any metal material or two or more alloy materials of copper, aluminum, titanium, zinc, iron, nickel, chromium, cobalt, silver and gold; or the first protruding structure has any one, two or more than two of an inclined surface, a cambered surface, a plane and an irregular reflection surface that are favorable for microwave reflection.

6. The scattering film as claimed in claim 1, wherein the first connecting layer is an adhesive film layer; or a height h1 of the first protruding structure is less than or equal to a thickness d2 of the first connecting layer.

7. The scattering film as claimed in claim 1, wherein the scattering film is of a flexible, foldable and bendable structure.

8. The scattering film as claimed in claim 1, wherein the first protruding structure and the first carrier layer are integrally formed.

9. An electronic device, comprising the scattering film as claimed in claim 1, wherein the electronic device further comprises an antenna device, and a surface of the antenna device is connected with the scattering film.

10. The electronic device as claimed in claim 9, wherein the surface of the antenna device is connected with the scattering film by a first connecting layer of the scattering film; or a third connecting layer is disposed on the surface of the antenna device, and the scattering film is connected with the antenna device by the third connecting layer.

11. The electronic device as claimed in claim 9, wherein an electromagnetic scattering film is disposed on another surface opposite to a surface of the antenna device provided with the scattering film, and the electromagnetic scattering film at least comprises: a second carrier layer, provided with a through hole penetrating an upper and lower surface of the second carrier layer.

12. The electronic device as claimed in claim 11, wherein the second carrier layer is a metal conductive layer.

13. The electronic device as claimed in claim 12, wherein a metal residual rate of the metal conductive layer is in a range of 1% to 99%.

14. The electronic device as claimed in claim 11, wherein a second connecting layer is disposed on a surface of the second carrier layer, and the antenna device is connected with the electromagnetic scattering film by the second connecting layer; or a fourth connecting layer is disposed on the surface of the antenna device, and the electromagnetic scattering film is connected with the antenna device by the fourth connecting layer.

15. The electronic device as claimed in claim 14, wherein a third protruding structure protruding into the second connecting layer is disposed on the surface of the second carrier layer; or a second insulation layer is disposed on another surface opposite to a surface of the second carrier layer provided with the second connecting layer.

16. The electronic device as claimed in claim 11, wherein, when the through hole is a circular hole, a ratio of a diameter of the through hole to a wavelength of a microwave is in a range of 1:200 to 1:100; and when the through hole is a non-circular hole, a ratio of a longest distance between two points on a cross-sectional edge of the through hole to the wavelength of the microwave is in a range of 1:200 to 1:100.

17. The electronic device as claimed in claim 11, wherein the electromagnetic scattering film is of a flexible, foldable and bendable structure.

* * * * *